(12) United States Patent  
Franzolin

(10) Patent No.: US 8,662,066 B2
(45) Date of Patent: Mar. 4, 2014

(54) CLOSURE DEVICE ASSOCIABLE WITH AN OPENING OF A COOKING CHAMBER OF AN OVEN WITH A TROLLEY FOR THE SEALED CLOSURE OF THE CHAMBER IN THE ABSENCE OF THE TROLLEY

(75) Inventor: Enrico Franzolin, Vigodarzere (IT)

(73) Assignee: Unox S.p.A., Vigodarzere (PD) (IT)

( * ) Notice: Subject to any disclaimer, the term of this patent is extended or adjusted under 35 U.S.C. 154(b) by 248 days.

(21) Appl. No.: 13/048,080

(22) Filed: Mar. 15, 2011

(65) Prior Publication Data

US 2011/0226229 A1    Sep. 22, 2011

(30) Foreign Application Priority Data

Mar. 16, 2010  (IT) .............................. PD2010A0078

(51) Int. Cl.
*A21B 3/02*       (2006.01)

(52) U.S. Cl.
USPC ......... 126/19 R; 126/190; 126/198; 432/115; 432/242; 432/250

(58) Field of Classification Search
USPC ......... 126/190, 19 R, 198; 432/115, 242, 250
See application file for complete search history.

(56) References Cited

U.S. PATENT DOCUMENTS

| 3,250,040 | A | * | 5/1966 | Squires ........................ 49/482.1 |
| 3,580,322 | A | * | 5/1971 | Herbert et al. ............. 160/231.1 |
| 5,431,490 | A | * | 7/1995 | Edwards ........................ 312/116 |
| 6,017,215 | A | * | 1/2000 | Lillja et al. .................... 432/250 |
| 6,648,637 | B2 | * | 11/2003 | Quigley ........................ 432/242 |
| 6,805,555 | B1 | * | 10/2004 | Nguyen et al. .................. 432/65 |
| 2003/0099915 | A1 | * | 5/2003 | Quigley ........................ 432/242 |
| 2006/0102164 | A1 | | 5/2006 | Rabe |
| 2010/0000510 | A1 | * | 1/2010 | Koos ............................. 126/194 |

FOREIGN PATENT DOCUMENTS

| DE | 8902508 U1 | 5/1989 |
| DE | 102006029217 A1 | 12/2007 |
| JP | 59114834 U | 8/1984 |
| JP | 5317127 A | 12/1993 |

\* cited by examiner

*Primary Examiner* — Kenneth Rinehart
*Assistant Examiner* — Jorge Pereiro
(74) *Attorney, Agent, or Firm* — Volpe and Koenig, P.C.

(57) ABSTRACT

A closure device associable with the opening of the cooking chamber of an oven of the type with trolley is described, the oven including a closure door associated with the chamber, for the sealed closure of the cooking chamber in the absence of the trolley, the device includes a closure element capable of being placed to close a portion of the opening of the chamber that is not involved by the closure door, the portion of opening being capable of permitting the closure of the door when the trolley is inserted into the cooking chamber, the closure element co-operating in a sealed manner with respective sections of gaskets arranged at the opening, for the sealed closure of the cooking chamber when the trolley is not inserted in the chamber.

17 Claims, 5 Drawing Sheets

CLOSURE DEVICE ASSOCIABLE WITH AN OPENING OF A COOKING CHAMBER OF AN OVEN WITH A TROLLEY FOR THE SEALED CLOSURE OF THE CHAMBER IN THE ABSENCE OF THE TROLLEY

FIELD OF INVENTION

The present invention concerns a closure device associable with the opening of the cooking chamber of an oven of the type with a trolley.

BACKGROUND

The invention is placed particularly, although not exclusively, in the specific sector of cooking ovens, of the type known as "with trolley", in which provision is made in the cooking chamber for housing a baking pan-supporting structure mounted on a movable trolley. The structure with baking pan-supporting shelves is intended to be received within the cooking chamber while the lower frame of the trolley, provided with wheels, remains outside the chamber. In order to allow such partial housing of the trolley, the door of the oven, suitable for closing the cooking chamber in a sealed manner, has at the bottom a recess, such as not to interfere with the frame of the trolley when the latter is housed in the cooking chamber. In the area of the opening defined by the recess, the seal is ensured by the action of a gasket provided on the door and co-operating with a corresponding front surface of the frame of the trolley, the latter in its turn being pressed against part of the gasket provided in the area of the opening of the oven, said gasket interacting for the remainder with the door of the oven, in order to ensure the sealed closure of the cooking chamber.

In these ovens it is necessary to be able to ensure the sealed closure of the door also in the absence of the baking pan-supporting trolley, in particular in the stages of preheating the oven, when it is necessary to ensure the insulation of the cooking chamber without heat dispersion.

In the aforesaid stages, when the baking pan-supporting trolley is withdrawn from the cooking chamber, the sealing thereof is typically ensured by using a closure plate removably hooked to the door or to the oven structure, in the region of the lower recess provided in the door. This plate therefore serves to take the place of the corresponding front surface of the trolley frame and is suitable for co-operating with the gaskets provided on the door and at the opening of the chamber, so as to ensure sealing following the closure of the oven door. An example of such a sealing plate is described in US 2006/0102164.

Another known solution provides for mounting a closure plate of the aforesaid type on the door by means of a hinging mechanism in order to displace it from a rest position, not interfering with the trolley, to an operative position for sealed closure, in the absence of the trolley.

In both the solutions indicated, however, there are limitations owing both to the necessity for the assembly/disassembly of the plate on/from the oven depending on the operating requirements, and the complexity of the hinging mechanism to be provided when the plate is fitted at the edge of the closure door. In this second case the hinging device is moreover subject to possible malfunctions owing to the action of cooking liquids and fats which may compromise the functioning thereof or which in any case necessitate cleaning of the mechanism at a certain frequency in order to ensure its overall efficiency.

SUMMARY

The objective is to provide a closure device for the opening of the cooking chamber of an oven of the type with trolley, structurally and functionally designed so as to make it possible to remedy the limitations mentioned with reference to the prior art cited. This problem is solved by the invention by means of a closure device of the aforesaid type, produced in accordance with the following claims.

BRIEF DESCRIPTION OF THE DRAWINGS

Further features and advantages of the invention will become clear from the following detailed description of a preferred exemplary embodiment thereof, illustrated by way of non-limiting example with reference to the appended drawings, in which.

DETAILED DESCRIPTION OF THE PREFERRED EMBODIMENTS

Figure 6:
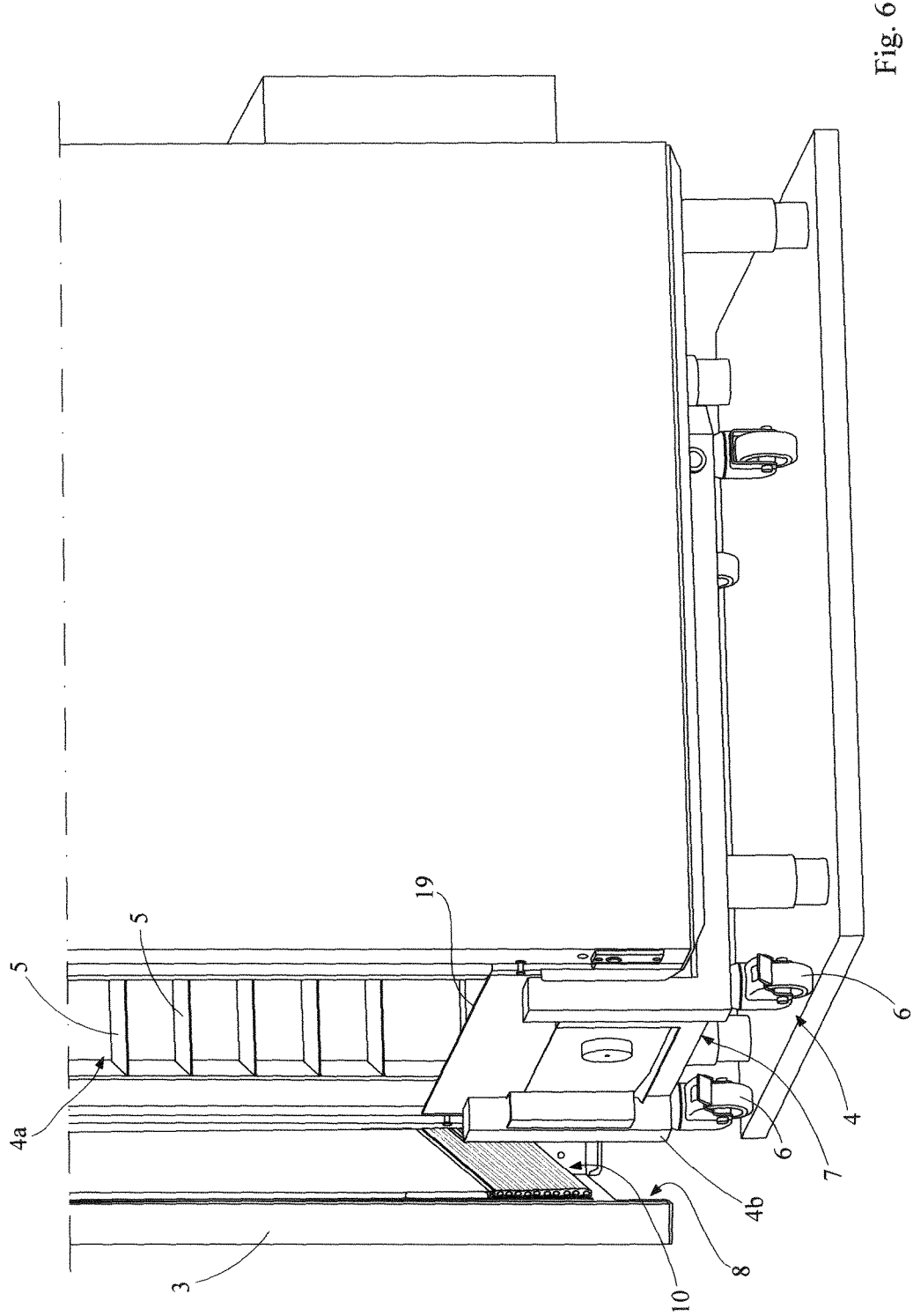
FIG. 6 is a partial perspective view of the oven of the preceding figures which is shown in combination with the trolley inserted in the cooking chamber.

With reference to the drawings mentioned, the reference 1 indicates, as a whole, a cooking oven comprising a bearing structure in which is provided a cooking chamber 2 with the opening 2*a* of which is associated a closure door 3, mounted in a hinged manner on the bearing structure. The oven 1 is of the type with trolley, which is arranged for housing in the cooking chamber a baking pan-supporting trolley 4. The trolley comprises an upper support frame 4*a* for a plurality of baking pan-supporting shelves 5, which is connected to a lower frame 4*b* equipped with wheels 6. The frames are connected by a front support structure 7 suitable for maintaining the baking pans suitably spaced apart to allow the complete housing of the shelves within the chamber without interference with the lower wheel-bearing frame, as shown clearly in FIG. 6.

The door 3, in its lower part, has a recess 8, of a configuration such as not to cause interference by the door with the front structure 7 of the trolley, when the latter is inserted into the cooking chamber 2 and the door 3 is closed in a sealed manner on the opening 2*a*.

In order to ensure the seal in the absence of the trolley, provision is made for the use of a closure device, which comprises a closure element 10 produced as a sheet-like body made of flexible material, for example of rubber, the sheet-like body being secured to an inner frame 11 of the door 3 along an upper edge thereof delimiting the recess 8.

Figure 1:
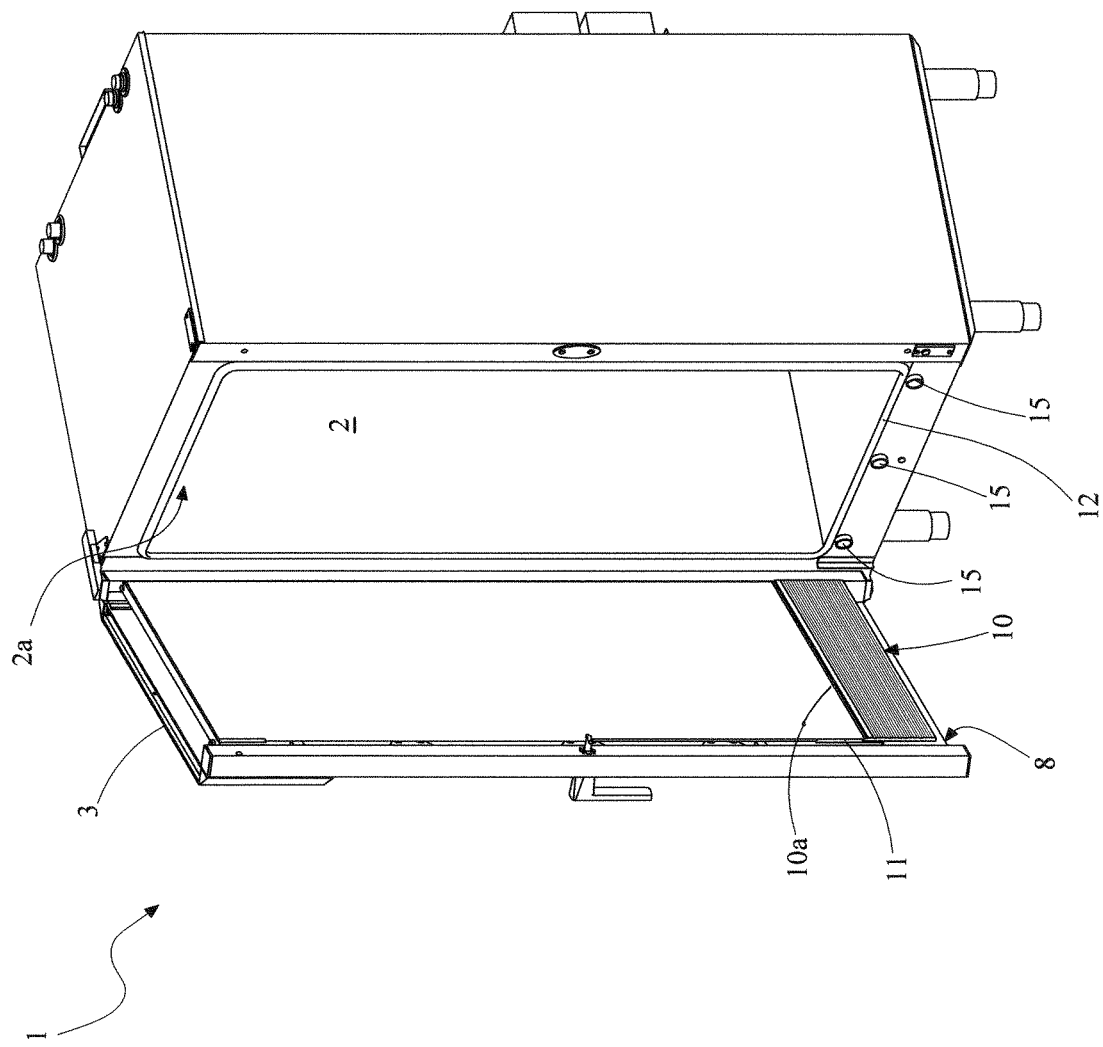
FIG. 1 is a perspective view of an oven with trolley, provided with a sealed closure device according to the invention.
Figure 2:
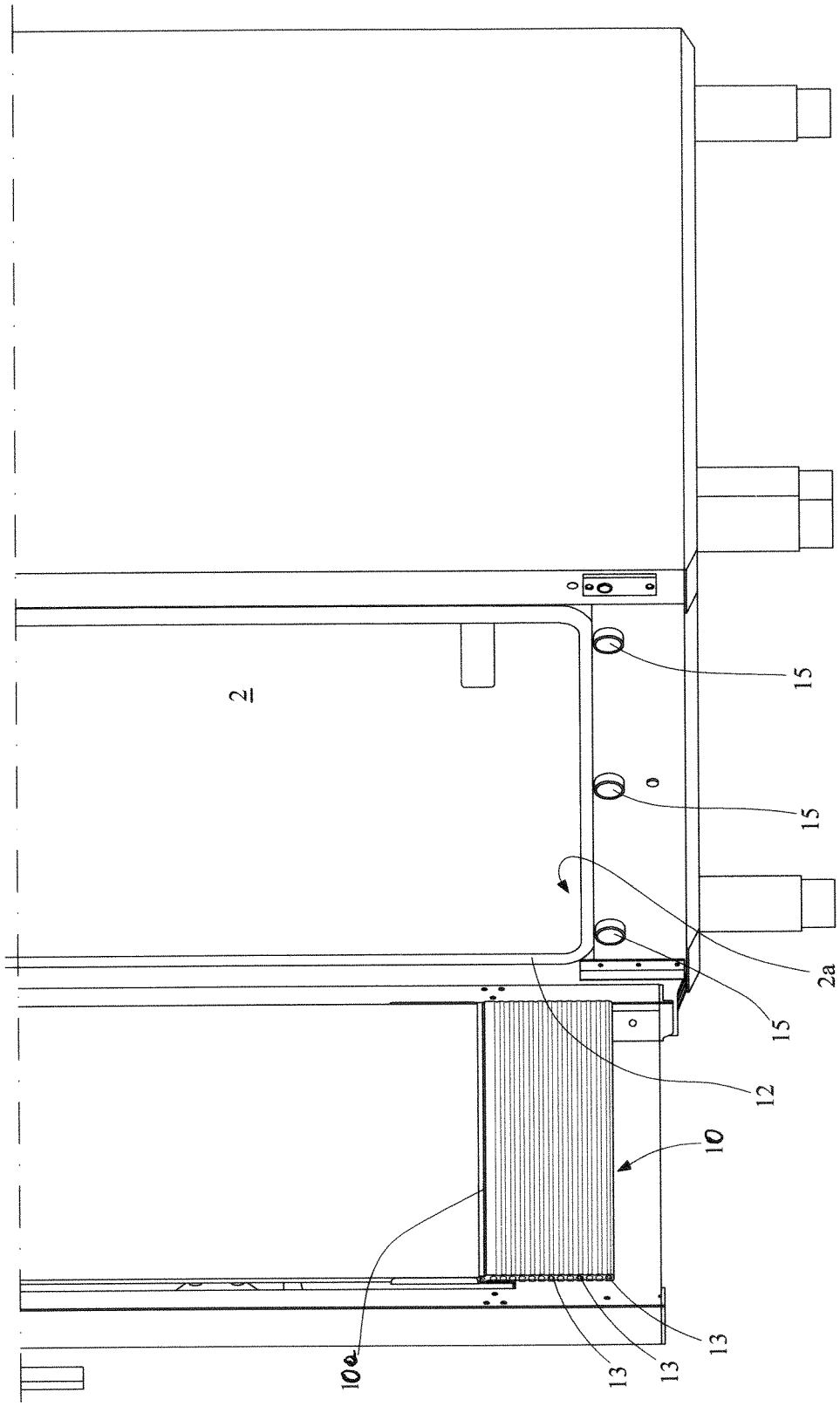
FIG. 2 is a partial perspective view of the oven of FIG. 1 with the device according to the invention.
Figure 3:
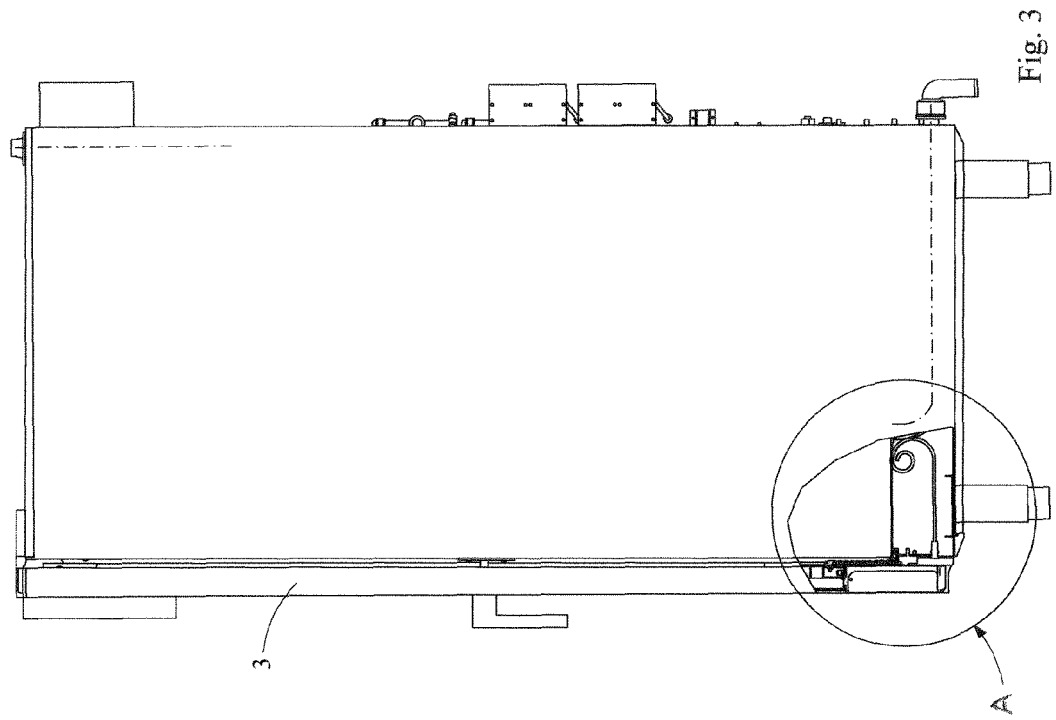
FIG. 3 is a side view in partial section of the oven of the preceding figures with sealed closure of the chamber in the absence of the trolley.
Figure 4:
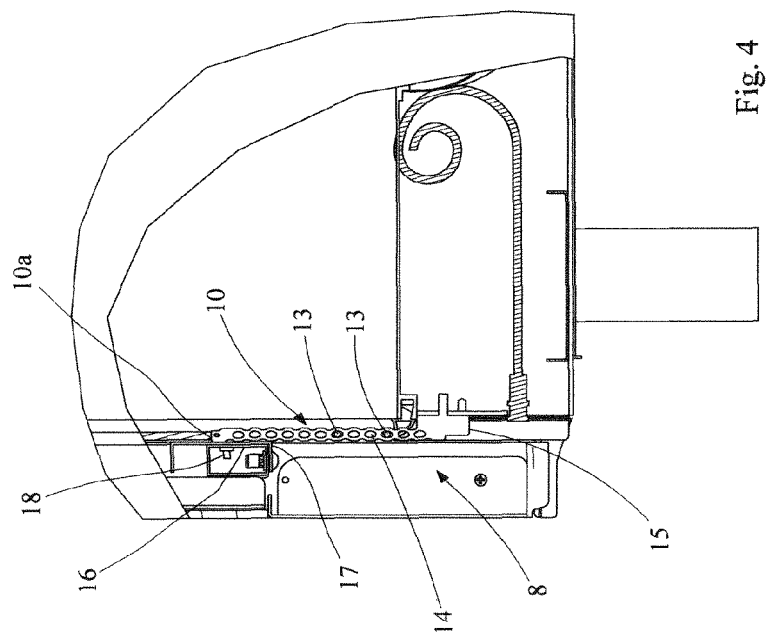
FIG. 4 is a sectional view on an enlarged scale of the detail indicated by the arrow A of FIG. 3.

Preferably, the element 10 has a quadrilateral shape, as is clearly illustrated in FIG. 2, is secured to the frame 11 of the door along a peripheral side thereof 10*a*, and has dimensions such as to extend to close the corresponding portion of the opening opposite the recess 8, following the closure of the door, being set in contact against the corresponding section of gasket 12 running peripherally at the contour of the opening in the region of said portion.

The closure element 10 has preferred folding directions which extend parallel to the side 10a and permit at least partial folding thereof about such directions.

In more detail, the sheet-like body of the element 10 is provided with a plurality of inserts for structural stiffening, all designated by 13, and which are conveniently produced in the shape of small metal rods running inside corresponding transverse cavities 14, provided in the sheet-like body. The metal inserts 13 extend, spaced apart from one another, parallel to the side 10a, for the entire length of the sheet-like body, providing the latter with suitable structural rigidity.

The closure device is further provided with retainers that act by magnetic attraction between the sheet-like body 10 and the stationary frame of the oven defining the opening 2a of the cooking chamber. Said means comprise a plurality of magnets 15 provided along the lower peripheral edge of the opening 2a, which are capable of co-operating, by magnetic attraction, with the inserts 13, suitably made of ferromagnetic material, so as to ensure the retention of the sheet-like body 10 against the gasket 12 of the opening 2a, when the oven door 3 is closed, in order to obtain the complete sealed closure of the cooking chamber 2, and in particular the seal for the air contained in the chamber itself.

The closure element 10 is in addition conveniently secured in a removable manner to the frame 11 of the door. A plate-like support 16 is provided, firmly fixed to the frame 11 of the door, and a second plate-like support 17 on which the sheet-like body 10 is anchored by adhesive means along the fixing side 10a of the closure element, the supports 16, 17 being capable of being removably secured to one another by means of screw clamping means 18 with respective clamping nuts, so that said closure element is removably connectable to the frame of said door. Such a removable fixing system is the subject of a patent application, assigned to the same Assignee as the present application, filed under No. PD2010A00032, which is incorporated by reference in its entirety as if fully set forth.

In use, when in the absence of the trolley 4 it is wished to ensure the sealed closure of the cooking chamber 2, for example in the stage of pre-heating of the oven, as a consequence of the closure of the door the closure element 10 is held, by magnetic attraction (between the magnets 15 and the rods 13), on the lower portion of the opening 2a, ensuring the seal in the region of said portion. In this stage the element 10 is maintained set against the sections of gasket 12 of the opening which are opposite thereto, thus ensuring the sealing action.

Figure 5:
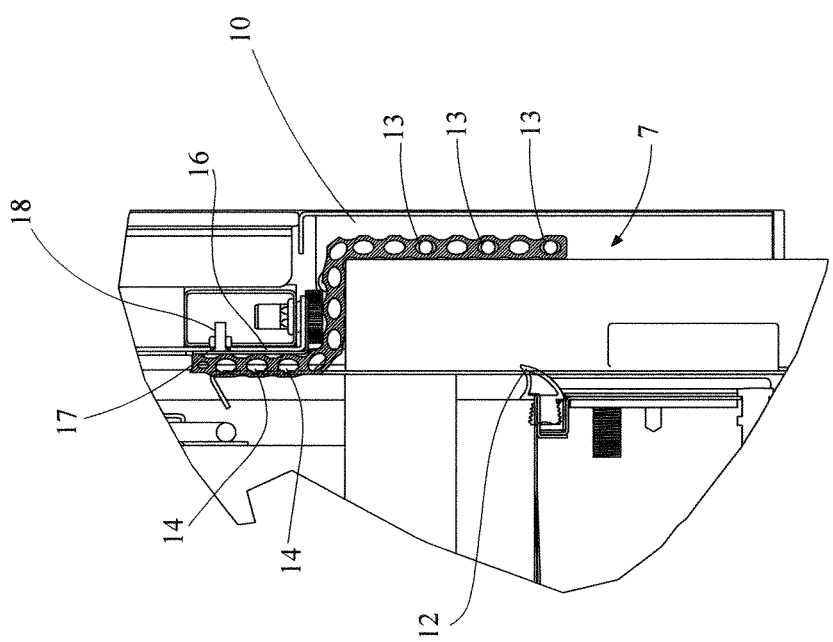
FIG. 5 is a view corresponding to that of FIG. 4 with sealed closure of the chamber in the presence of the trolley

Subsequently, whenever it is necessary to insert the trolley 4 into the cooking chamber 2, the closure element 10, owing to its flexibility and capacity for folding along preferred lines, following the closure of the door is still received, between the front structure of the trolley and the inner frame of the door, inside the recess 8, as is clearly illustrated in FIG. 5. In this way, the element 10 does not interfere with the trolley, permitting the sealed closure of the cooking chamber, ensured in this case mainly by the trolley co-operating with the door. The front structure 7 of the trolley 4 has a plate-like portion, one surface 19 of which, following the closure of the door, remains pressed against a section of the gasket 12 provided along the perimeter of the opening of the chamber (the remainder of the gasket co-operating with the door), ensuring a seal in the area of the recess 8. On the opposite surface of the portion 19 (following the closure of the door) there acts an upper section of the sheet-like body 10, extending at the side 10a for fixing to the door, which therefore functions as a gasket co-operating with the trolley. The interaction of the front structure 7 of the trolley with the aforesaid gaskets therefore ensures the sealed closure of the cooking chamber in the presence of the trolley 4 inside the chamber, during the cooking stages provided for. In this stage, the closure element does not interfere with the trolley, though remaining secured to the door, owing to its capacity for deforming and remaining received inside the recess 8, as described above.

The invention therefore achieves the aims proposed, providing the advantages indicated with respect to known solutions.

A principal advantage lies in the fact that by means of the closure device according to the invention, there is no need for the presence of any mechanism for hinging it to the door or to the oven structure, while in any case remaining secured to the door, and therefore being quick and convenient to use when required, without the need for assembly/disassembly of specific closure plates, as provided for instead by conventional solutions.

What is claimed is:

1. A closure device associable with the opening of a cooking chamber of a trolley-type oven, the oven including a closure door associated with said chamber, for sealed closure of the cooking chamber in an absence of the trolley, said device comprising a closure element capable of being placed to close a portion of the opening of the chamber that is not engaged by the closure door, the portion of the opening being capable of permitting the closure of the door when the trolley is inserted into the cooking chamber, said closure element co-operating in a sealed manner with respective sections of gaskets arranged at said opening, for the sealed closure of the cooking chamber when the trolley is not inserted in said chamber, said closure element is secured to the door of the oven and is at least partially flexible, so that said closure element is displaceable between an operative state in which, in the absence of the trolley in the cooking chamber and following the closure of the door, said element remains set, in an unfolded configuration, against the portion of opening, in order to ensure the sealed closure thereof, and a non-operative state in which, with the trolley inserted in said chamber and following the closure of the door, said element is still received in an at least partly folded configuration, between the door and the trolley, without interfering with the sealed closure in a region of said portion.

2. The closure device according to claim 1, wherein said closure element comprises a quadrilateral-shaped sheet-like body, which is secured along a peripheral side to a frame edge of the door, said element having preferred folding directions extending parallel to said side for fixing of the closure element.

3. The closure device according to claim 2, further comprising a first plate-like support firmly fixed to the frame of the door, and a second plate-like support on which the sheet-like body is anchored, by an adhesive, along the fixing side of the closure element, said first and second support being capable of being removably secured to one another by screw clamping, so that said closure element is removably connectable to the frame of said door.

4. A door for a trolley-type cooking oven, arranged for sealed closure of the cooking chamber of said oven, the door comprising a closure device as set forth in claim 1, which is associable with an opening of said cooking chamber.

5. A trolley-type cooking oven, comprising a cooking chamber, a door for closure of the opening of said chamber and a closure device, according to claim 1, associable with the opening of said oven, for the sealed closure of the corresponding cooking chamber when the trolley is not present.

6. A closure device associable with the opening of a cooking chamber of a trolley-type oven, the oven including a closure door associated with said chamber, for sealed closure of the cooking chamber in an absence of the trolley, said device comprising a closure element, which comprises a quadrilateral-shaped sheet-like body, which is secured along a peripheral side to a frame edge of the door, said element having preferred folding directions extending parallel to said side for fixing of the closure element and is capable of being placed to close a portion of the opening of the chamber that is not engaged by the closure door, the portion of the opening being capable of permitting the closure of the door when the trolley is inserted into the cooking chamber, said closure element co-operating in a sealed manner with respective sections of gaskets arranged at said opening, for the sealed closure of the cooking chamber when the trolley is not inserted in said chamber, said closure element is secured to the door of the oven and is at least partially flexible, so that said closure element is displaceable between an operative state in which, in the absence of the trolley in the cooking chamber and following the closure of the door, said element remains set, in an unfolded configuration, against the portion of opening, in order to ensure the sealed closure thereof, and a non-operative state in which, with the trolley inserted in said chamber and following the closure of the door, said element is still received in an at least partly folded configuration, between the door and the trolley, without interfering with the sealed closure in a region of said portion, wherein said sheet-like body comprises at least one insert for structural stiffening of said body, which extends longitudinally in the body parallel to the side for fixing to the frame of the door.

7. The closure device according to claim 6, wherein the sheet-like body of said closure element is made of rubber and provides at least one inner cavity in which said at least one insert is arranged, said at least one insert being made of a metallic material.

8. The closure device according to claim 7, further comprising a plurality of inserts which are shaped like small metal rods, housed in respective internal cavities of said body, said inserts extending parallel to and spaced apart from one another.

9. A door for a trolley-type cooking oven, arranged for sealed closure of the cooking chamber of said oven, the door comprising a closure device as set forth in claim 6, which is associable with an opening of said cooking chamber.

10. A trolley-type cooking oven, comprising a cooking chamber, a door for closure of the opening of said chamber and a closure device, according to claim 6, associable with the opening of said oven, for the sealed closure of the corresponding cooking chamber when the trolley is not present.

11. A closure device associable with the opening of a cooking chamber of a trolley-type oven, the oven including a closure door associated with said chamber, for sealed closure of the cooking chamber in an absence of the trolley, said device comprising a closure element, which comprises a quadrilateral-shaped sheet-like body, which is secured along a peripheral side to a frame edge of the door, said element having preferred folding directions extending parallel to said side for fixing of the closure element and is capable of being placed to close a portion of the opening of the chamber that is not engaged by the closure door, the portion of the opening being capable of permitting the closure of the door when the trolley is inserted into the cooking chamber, said closure element co-operating in a sealed manner with respective sections of gaskets arranged at said opening, for the sealed closure of the cooking chamber when the trolley is not inserted in said chamber, said closure element is secured to the door of the oven and is at least partially flexible, so that said closure element is displaceable between an operative state in which, in the absence of the trolley in the cooking chamber and following the closure of the door, said element remains set, in an unfolded configuration, against the portion of opening, in order to ensure the sealed closure thereof, and a non-operative state in which, with the trolley inserted in said chamber and following the closure of the door, said element is still received in an at least partly folded configuration, between the door and the trolley, without interfering with the sealed closure in a region of said portion, the closure device further comprising removable retainers between the sheet-like body and a frame defining the opening of said chamber in proximity to said portion of opening.

12. The closure device according to claim 11, wherein said retainer acts by way of magnetic attraction between parts respectively associated with said body and with the frame of the opening.

13. The closure device according to claim 12, wherein said retainer comprises at least one first magnet element or element made of ferromagnetic material, provided on the peripheral edge of the opening and capable of co-operating, by magnetic attraction, with at least one corresponding second element made of ferromagnetic material or magnet element provided on said closure member, in a corresponding position, so as to ensure the retention, in said operative position, of the closure element on said portion of opening.

14. The closure device according to claim 13, wherein said at least one second ferromagnetic element is formed by at least one of said inserts of metallic material of said sheet-like body.

15. The closure device according to claim 14, wherein a plurality of magnets are provided, disposed along the contour of said portion of opening, and capable of mutual magnetic attraction with the corresponding plurality of metal inserts which are inserted in said body.

16. A door for a trolley-type cooking oven, arranged for sealed closure of the cooking chamber of said oven, the door comprising a closure device as set forth in claim 11, which is associable with an opening of said cooking chamber.

17. A trolley-type cooking oven, comprising a cooking chamber, a door for closure of the opening of said chamber and a closure device, according to claim 11, associable with the opening of said oven, for the sealed closure of the corresponding cooking chamber when the trolley is not present.

* * * * *